US012287425B2

(12) United States Patent
Harvey

(10) Patent No.: US 12,287,425 B2
(45) Date of Patent: Apr. 29, 2025

(54) QUANTUM ENTANGLEMENT ENHANCED RADAR

(71) Applicant: American Quantum Technology LLC, Georgetown, SC (US)

(72) Inventor: Charles Harvey, Arlington, VA (US)

(73) Assignee: American Quantum Technology LLC, Georgetown, SC (US)

( * ) Notice: Subject to any disclaimer, the term of this patent is extended or adjusted under 35 U.S.C. 154(b) by 269 days.

(21) Appl. No.: 17/980,261

(22) Filed: Nov. 3, 2022

(65) Prior Publication Data

US 2023/0408647 A1    Dec. 21, 2023

Related U.S. Application Data

(60) Provisional application No. 63/275,984, filed on Nov. 5, 2021.

(51) Int. Cl.
*G01S 7/40*     (2006.01)
*G01S 13/00*    (2006.01)

(52) U.S. Cl.
CPC .......... *G01S 7/4065* (2021.05); *G01S 13/003* (2013.01)

(58) Field of Classification Search
CPC . G01S 13/003; G01S 7/28; G01S 7/35; G01S 7/4008; G01S 7/4021; G01S 7/4065
See application file for complete search history.

(56) References Cited

U.S. PATENT DOCUMENTS

| 9,047,571 B2 | 6/2015 | Miller et al. |
| 2003/0133714 A1 | 7/2003 | Gat |
| 2012/0076503 A1 | 3/2012 | Habif |

(Continued)

FOREIGN PATENT DOCUMENTS

KR    10-2020-0042331    4/2020

OTHER PUBLICATIONS

Carvioto-Lagos et al., "The Hong-Ou-Mandel Interferometer in the Undergraduate Laboratory", European Journal of Physics, vol. 33, 2012, pp. 1843-1850.

(Continued)

*Primary Examiner* — Timothy X Pham
(74) *Attorney, Agent, or Firm* — Dority & Manning, P.A.

(57) ABSTRACT

A radar time synchronization system according to an example embodiment of the present disclosure include a transmitter radar, a receiver radar, and a quantum interferometer device communicatively coupled to the transmitter radar and the receiver radar. The quantum interferometer device includes a quantum entanglement source operable to transmit a first entangled photon to the transmitter radar and a second entangled photon to the receiver radar. The quantum interferometer device further includes a quantum entanglement detector operable to receive the first entangled photon from the transmitter radar and the second entangled photon from the receiver radar. The quantum entanglement detector further operable to detect a quantum interference effect associated with the first entangled photon and the second entangled photon. The quantum interferometer device synchronizes a first time associated with the transmitter radar and a second time associated with the receiver radar based at least in part on the quantum interference effect.

20 Claims, 5 Drawing Sheets

(56) References Cited

U.S. PATENT DOCUMENTS

2016/0233964 A1\* 8/2016 Frohlich ............... H04B 10/85
2023/0324534 A1\* 10/2023 Kahana ................ G01S 13/931
                                                                                    342/118

OTHER PUBLICATIONS

Chuang, "Quantum Algorithm for Distributed Clock Synchronization," arXiv:quant-ph/0005092v1, May 22, 2020, 4 pages.

Hong, "Measurement of Sub-Picosecond Time Intervals Between Two Photons by Interference," Physical Review Letters, vol. 59 18, 1987, pp. 2044-2046.

Josa et al., "Quantum Clock Synchronization Based on Shared Prior Entanglement," arXiv:quant-ph/0004105v3, Jun. 30, 2000, 4 pages.

Lyons et al., "Attosecond-Resolution Hong-Ou-Mandel Interferometry," Science Advances, vol. 4, May 4, 2018, 9 pages.

Quan et al., "Demonstration of Quantum Synchronization Based on Second-Order Quantum Coherence of Entangled Photons," arXiv:1602.06371v1, Feb. 20, 2016, 10 pages.

Torrome et al., "Introduction to Quantum Radar," arXiv:2006.14238v3, Jan. 18, 2021, 68 pages.

Weib, "Synchronization of Bistatic Radar Systems," International Geoscience and Remote Sensing Symposium, Anchorage, Alaska, United States, Sep. 20-24, 2004, pp. 1750-1753.

Yu Yang et al., "Two-parameter Hong-Ou-Mandel Dip", Scientific Reports 9, Article No. 10821, published Jul. 25, 2019, 16 pages.

A. A. Ezhov, "Role of Interference and Entanglement in Quantum Neural Processing", Proceedings of SPIE vol. 4591, Published Nov. 21, 2001, 14 pages.

International Search Report and Written Opinion for Application PCT/US2022/048768, mailed Mar. 14, 2023, 10 pages.

\* cited by examiner

QUANTUM ENTANGLEMENT ENHANCED RADAR

PRIORITY CLAIM

The present application is based on and claims priority to U.S. Provisional Patent Application No. 63/275,984, having a filing date of Nov. 5, 2021, which is incorporated by reference herein.

FIELD

The present disclosure relates generally to radar systems. More particularly, the present disclosure relates to a quantum entanglement enhanced radar system.

BACKGROUND

Since the invention of bi-static radar, clock synchronization to define time-of-arrival of signals and to generate accurate baselines between two or more radar stations has been a cornerstone of the field. A problem with existing bi-static and/or multi-static radar systems is that the clocks associated with a transmitter radar and a receiver radar of such systems are not accurately and/or precisely synchronized, which results in inaccurate measurements of the position and/or velocity of a target.

SUMMARY

Aspects and advantages of embodiments of the present disclosure will be set forth in part in the following description, or may be learned from the description, or may be learned through practice of the embodiments.

A radar time synchronization system according to an example embodiment of the present disclosure can include a transmitter radar. The radar time synchronization system can further include a receiver radar. The radar time synchronization system can further include a quantum interferometer device that can be communicatively coupled to the transmitter radar and the receiver radar. The quantum interferometer device can include a quantum entanglement source that can be operable to transmit a first entangled photon to the transmitter radar and a second entangled photon to the receiver radar. The quantum interferometer device can further include a quantum entanglement detector that can be operable to receive the first entangled photon from the transmitter radar and the second entangled photon from the receiver radar. The quantum entanglement detector can be further operable to detect a quantum interference effect associated with the first entangled photon and the second entangled photon. The quantum interferometer device can synchronize a first time associated with the transmitter radar and a second time associated with the receiver radar based at least in part on the quantum interference effect associated with the first entangled photon and the second entangled photon.

A method to synchronize time of a radar system according to an example embodiment of the present disclosure can include transmitting, by a quantum entanglement source of the radar system, a first entangled photon to a transmitter radar and a second entangled photon to a receiver radar. The method can further include receiving, by a quantum entanglement detector of the radar system, the first entangled photon from the transmitter radar and the second entangled photon from the receiver radar. The method can further include detecting, by the quantum entanglement detector, a quantum interference effect associated with the first entangled photon and the second entangled photon. The method can further include synchronizing, by a quantum interferometer device comprising the quantum entanglement source and the quantum entanglement detector, a first time associated with the transmitter radar and a second time associated with the receiver radar based at least in part on the quantum interference effect associated with the first entangled photon and the second entangled photon.

These and other features, aspects, and advantages of various embodiments of the present disclosure will become better understood with reference to the following description and appended claims. The accompanying drawings, which are incorporated in and constitute a part of this specification, illustrate embodiments of the present disclosure and, together with the description, serve to explain the related principles of the present disclosure.

BRIEF DESCRIPTION OF THE DRAWINGS

Detailed descriptions of embodiments directed to one of ordinary skill in the art are set forth in the specification, which makes reference to the appended figures, in which.

Figure 1:
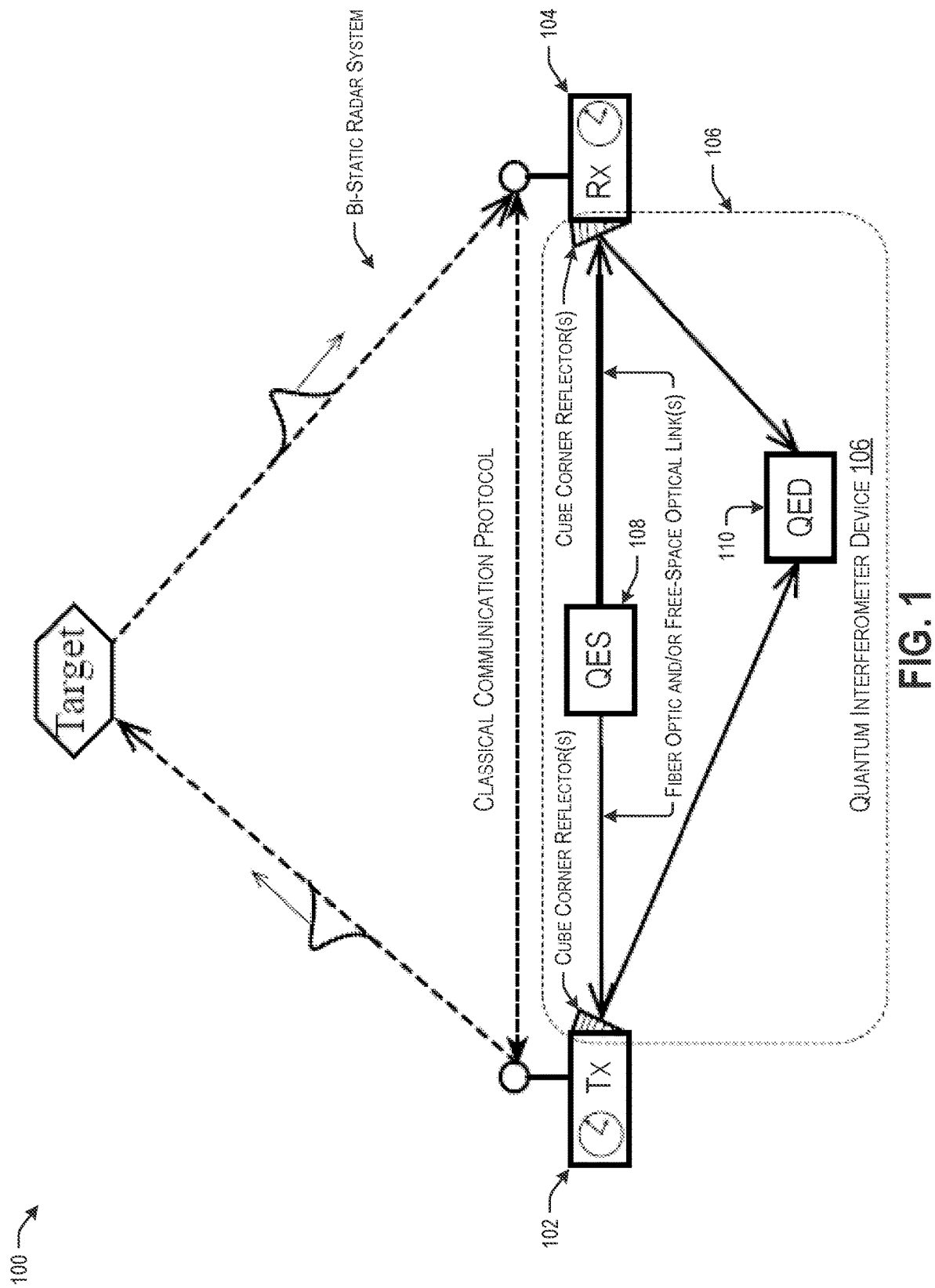
FIG. 1 illustrates a diagram of an example, non-limiting system that can facilitate quantum entanglement enhanced clock synchronization in a radar system in accordance with one or more example embodiments of the present disclosure.

Repeat use of reference characters in the present specification and accompanying drawings is intended to represent the same or analogous features or elements of the present disclosure.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Unless otherwise specified, as used herein, terms of approximation, such as "approximately," "substantially," and/or "about," refer to being within a 10 percent (%) margin of error of the stated value. As referenced herein, the terms "or" and "and/or" are generally intended to be inclusive (that is (i.e.), "A or B" or "A and/or B" are each intended to mean "A or B or both"). As referred to herein, the terms "first," "second," "third," etc. can be used interchangeably to distinguish one component from another and are not intended to signify location or importance of the individual components.

As used herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, and/or physical coupling. As referenced herein, the term "entity" refers to a human, a user, an end-user, a consumer, a computing device and/or program (e.g., a processor, computing hardware and/or software, an application, etc.), an agent, a machine learning (ML) and/or artificial intelligence (AI) algorithm, model, system, and/or application, and/or another type of entity that can implement one or more embodiments of the present disclosure as described herein, illustrated in the accompanying drawings, and/or included in the appended claims.

Example aspects of the present disclosure are directed to radar time synchronization systems. Clock synchronization between a transmitter (Tx) radar and a receiver (Rx) radar in existing bi-static and/or multi-static radar systems is one of the primary limitations to measure the position and/or velocity of a target. The global positioning systems (GPS) and atomic clock synchronization have limitations and are capable of on the order of tens of nanosecond accuracies over relevant time periods for radar operations.

The radar time synchronization system according to one or more embodiments of the present disclosure can use quantum mechanical entanglement of photons to surpass the above-described limitations and provide picosecond-level clock synchronization even in GPS-denied environments. As described herein, the radar time synchronization system according to one or more embodiments of the present disclosure can accomplish this by, for example: exploiting the unique quantum correlations between two entangled photons, where one entangled photon can be sent to a transmitter radar and the other to a receiver radar; and by coupling a radar system (e.g., any standard radar system) to an interferometer such as, for instance, a Hong-Ou-Mandel (HOM) interferometer. The HOM interference, commonly known as the HOM dip, is highly sensitive to the phase difference in the two entangled photons. The radar time synchronization system according to one or more embodiments of the present disclosure can leverage the HOM dip to synchronize a first time associated with the transmitter radar and a second time associated with the receiver radar. The HOM dip is on the order of a picosecond, which corresponds to a baseline error between the transmitter radar and the receiver radar of less than 100 microns according to one or more embodiments of the present disclosure. As described herein, the radar time synchronization system according to one or more embodiments of the present disclosure can reduce the timing stability of typical bi-static radars to less than a picosecond and/or absolute timing accuracies of less than 100 picoseconds in a GPS denied environment.

The radar time synchronization system according to one or more embodiments of the present disclosure can improve existing high precision clocks using, for instance, quantum entanglement. In accordance with one or more embodiments of the present disclosure, the radar time synchronization system described herein can leverage quantum entanglement to produce orders of magnitude of improvement to clock synchronization. In additional and/or alternative embodiments of the present disclosure, the radar time synchronization system described herein can further utilize one or more volume holographic elements coupled with an interference effect (e.g., a quantum interference effect) such as, for instance, the Hong-Ou-Mandel (HOM) interference effect between entangled photons to define the baseline of a radar system between stations to unprecedented accuracy. In accordance with one or more embodiments of the present disclosure, for security purposes, the relatively higher degree of clock synchronization that can be realized using the radar time synchronization system described herein can facilitate potentially relatively shorter code validity intervals and/or provide for a radar system that is relatively more robust to radar jamming, which can facilitate relatively longer autonomy periods in GPS-denied environments. The radar time synchronization system according to one or more embodiments of the present disclosure system can be GPS independent and/or independent of any other external timing system (e.g., operationally independent of the GPS timing and/or any other external timing system).

As described below, to facilitate the above-described operations and/or technical effects, the radar time synchronization system according to one or more embodiments of the present disclosure can leverage bi-static radar technology, quantum optics technology, and volume holography technology to provide a quantum entanglement enhanced timing system that can be implemented in a radar system (e.g., a bi-static radar system, a multi-static radar system, etc.).

FIG. 1 illustrates a diagram of an example, non-limiting system 100 that can facilitate quantum entanglement enhanced clock synchronization in a radar system in accordance with one or more example embodiments of the present disclosure. In one or more embodiments of the present disclosure, system 100 can constitute a radar system that can include the above-described radar time synchronization system that can facilitate quantum entanglement enhanced clock synchronization in such a radar system.

System 100 according to one or more embodiments of the present disclosure can constitute and/or include a quantum entanglement enhanced timing radar system that can utilize the quantum entanglement of photons to facilitate improved time synchronization between a transmitter radar 102 and a receiver radar 104. As illustrated in the example embodiment depicted in FIG. 1, system 100 can include a quantum interferometer device 106 that can constitute and/or include, for instance, a quantum Hong-Ou-Mandel (HOM) interferometer device. In this example embodiment, quantum interferometer device 106 can include a quantum entanglement source 108 and/or a quantum entanglement detector 110. According to one or more embodiments of the present disclosure, quantum interferometer device 106 can be communicatively coupled to transmitter radar 102 and receiver radar 104. For example, quantum entanglement source 108 and/or quantum entanglement detector 110 of quantum interferometer device 106 can be communicatively coupled to transmitter radar 102 and/or receiver radar 104 as illustrated in the example embodiment depicted in FIG. 1.

In one or more embodiments of the present disclosure, system 100 can facilitate the above-described improved time synchronization between transmitter radar 102 and receiver radar 104 using, for instance, one or more fiber optic links and/or one or more free-space optical links between quantum entanglement source 108, transmitter radar 102, and/or receiver radar 104. As described below, in one or more embodiments of the present disclosure, quantum entanglement source 108 can be operable to transmit (e.g., via a signal, light and/or laser beam, etc.) a first entangled photon to transmitter radar 102 and a second entangled photon to receiver radar 104. In these one or more embodiments, quantum entanglement detector 110 can be operable to receive (e.g., via a reflected signal, reflected light and/or laser beam, etc.) the first entangled photon from transmitter radar 102 and/or the second entangled photon from receiver radar 104. In these one or more embodiments, quantum entanglement detector 110 and can be further operable to detect a quantum interference effect (e.g., the HOM dip described above) that can be associated with the first entangled photon and the second entangled photon. In these one or more embodiments, quantum interferometer device 106 can synchronize a first time associated with transmitter radar 102 and a second time associated with receiver radar 104 based at least in part on such a quantum interference effect (e.g., based at least in part on detection and/or preservation of the above-described HOM dip) that can be associated with the first entangled photon and the second entangled photon.

In one or more embodiments of the present disclosure, quantum interferometer device 106 and/or quantum entanglement detector 110 can include a controllable optical delay component such as, for instance, a controllable optical delay and/or a feedback loop, for example, as described below with reference to the example embodiment depicted in FIG. 2. In these one or more embodiments, such a controllable optical delay can be operable to receive the above-described first entangled photon and/or second entangled photon and/or can be further operable to track quantum interference (e.g., the above-described HOM dip) associated with the first entangled photon and the second entangled photon to detect the quantum interference effect.

In the example embodiment depicted in FIG. 1, a lab station (not illustrated or annotated in FIG. 1) can include quantum interferometer device 106, quantum entanglement source 108, and/or quantum entanglement detector 110. Transmitter radar 102 and/or receiver radar 104 according to one or more embodiments of the present disclosure can be located a certain distance from one another and/or from the lab station (e.g., from quantum interferometer device 106, quantum entanglement source 108, and/or quantum entanglement detector 110). In one or more embodiments of the present disclosure, quantum entanglement source 108 can produce entangled photons and direct a first entangled photon of such entangled photons to receiver radar 104 and a second entangled photon of such entangled photons to transmitter radar 102. In these one or more embodiments, the first entangled photon and/or the second entangled photon can be reflected back to quantum entanglement detector 110 using, for instance, one or more cube corner reflectors associated with transmitter radar 102 and/or receiver radar 104. In these one or more embodiments, upon receipt of the reflected first entangled photon and/or second entangled photon, quantum interferometer device 106 and/or quantum entanglement detector 110 can track and/or detect the quantum interference, which can constitute, for instance, the above-described HOM dip.

According to one or more embodiments of the present disclosure, if the HOM interference is detected (e.g., observed), then this can indicate that the distance traversed from the lab station (e.g., quantum interferometer device 106) to receiver radar 104 is identical to the distance traveled between the lab station (e.g., quantum interferometer device 106) and transmitter radar 102 (e.g., within the coherence length, typically in the femtosecond range). However, in one or more embodiments, the two distances can be unequal and/or can be time varying. To overcome this issue, according to one or more embodiments of the present disclosure, quantum interferometer device 106 (e.g., via quantum entanglement source 108 and/or quantum entanglement detector 110) can time tag (e.g., time stamp) the entangled photons and/or utilize a controllable optical delay ($\Delta t_{delay}$) in one or both arms, for example, between transmitter radar 102 and quantum entanglement detector 110 and/or between receiver radar 104 and quantum entanglement detector 110. The controllable optical delay according to one or more embodiments of the present disclosure can track (e.g., actively, in real-time, continuously, periodically, etc.) the HOM dip to keep transmitter radar 102 and receiver radar 104 to within a relatively tight temporal tolerance, and given the speed of light, keep them within a known trackable baseline distance apart, which can be expressed as:

$$\Delta t_{RX} + \Delta t_{delay} = \Delta t_{TX} \qquad \text{Equation (1)}$$

In one or more embodiments of the present disclosure, it can be this delay that can provide the correction to the clock synchronization, and thus provide an accurate clock (e.g., an accurate Einstein clock) between transmitter radar 102 and receiver radar 104.

To align quantum entanglement source 108 and quantum entanglement detector 110, in one or more embodiments, system 100 can employ volume holographic Bragg gratings and/or cube corner reflectors to linearly align the lab station (e.g., quantum interferometer device 106), transmitter radar 102, and receiver radar 104, and/or to produce idler laser pulses at a pump frequency of quantum entanglement source 108 (e.g., system 100 can filter this out of quantum entanglement source 108 detectors with, for instance, long pass and notch filters). In one or more embodiments of the present disclosure, system 100 (e.g., via quantum interferometer device 106 and/or quantum entanglement detector 110) can use these pump photons to synchronize the clocks associated with transmitter radar 102 and receiver radar 104 to within current atomic clock accuracies as a baseline to facilitate the search of the HOM dip. The volume holographic grating according to one or more embodiments of the present disclosure can be multiplexed and/or can kick the idler and signal down-converted entangled photons to quantum entanglement source 108, while sending the pump beam to a separate monitoring detector. In one or more embodiments of the present disclosure, this can achieve an accurate baseline colinearly among the lab station (e.g., quantum interferometer device 106), receiver radar 104, and transmitter radar 102, which can all be synchronized to within the HOM dip window. In an example embodiment, the above-described operations can be expressed as:

$$\Delta L_{LAB \to RX} = \Delta L_{RX \to LAB} \qquad \text{Equation (2)}$$

$$\Delta L_{LAB \to TX} = \Delta L_{TX \to LAB} \qquad \text{Equation (3)}$$

and $$\Delta L_{TX \leftrightarrow LAB} = \Delta L_{LAB \to RX} + \Delta L_{delay} \qquad \text{Equation (4)}$$

Giving the desired result, $$\Delta L_{TX \leftrightarrow RX} = 2\Delta L_{LAB \to TX} - \Delta L_{delay} \qquad \text{Equation (5)}$$

Based at least in part on and/or by implementing the above-described operations and/or equation(s), system 100 can co-locate the lab station (e.g., quantum interferometer device 106) and transmitter radar 102 (and/or, in some embodiments, receiver radar 104) accurately by putting them on the same optical bench and this makes $\Delta L_{LAB \rightarrow TX}=0$ within the HOM-dip tolerance. According to one or more embodiments of the present disclosure, system 100 can thereby synchronize all clocks and/or provide an effective baseline as the offset $\Delta L_{TX \leftrightarrow RX}=C\Delta t_{delay}$.

In one or more embodiments of the present disclosure, collocation of the lab station (e.g., quantum interferometer device 106), transmitter radar 102, and/or receiver radar 104 is not performed by system 100, as system 100 can use the $\Delta t_{delay}$ to correctly synchronize the atomic station clocks between transmitter radar 102 and receiver radar 104 as shown in FIG. 1. In some example embodiments, this is where transmitter radar 102 can be communicated to receiver radar 104 over classical comm (e.g., a classical communication protocol) using, for example, the pump beam for the spontaneous parametric down conversion production of the entangled photons. This can be expressed as:

$$t_{TX}=t_{RX}+\Delta t_{delay} \qquad \text{Equation (6)}$$

According to one or more embodiments of the present disclosure, the achievable $\Delta L_{delay}$ from the HOM technique (e.g., observing the HOM dip) can approach 10 femtoseconds over fiber optics separated by 4 km. It should be appreciated that system 100 can be implemented as a free-space optical application and/or can be applied to ground-to-ground, ground-to-space, air-to-space, and/or ground-to-air bi-static radar stations. While system 100 according to one or more embodiments of the present disclosure can achieve sub-femtosecond resolutions by scanning and/or tracking the HOM dip, the HOM effect can be employed by system 100 to achieve autosecond resolution in one or more other embodiments described herein, which can reduce the size of the baseline of the bi-static radar while keeping constant accuracy.

Figure 2:
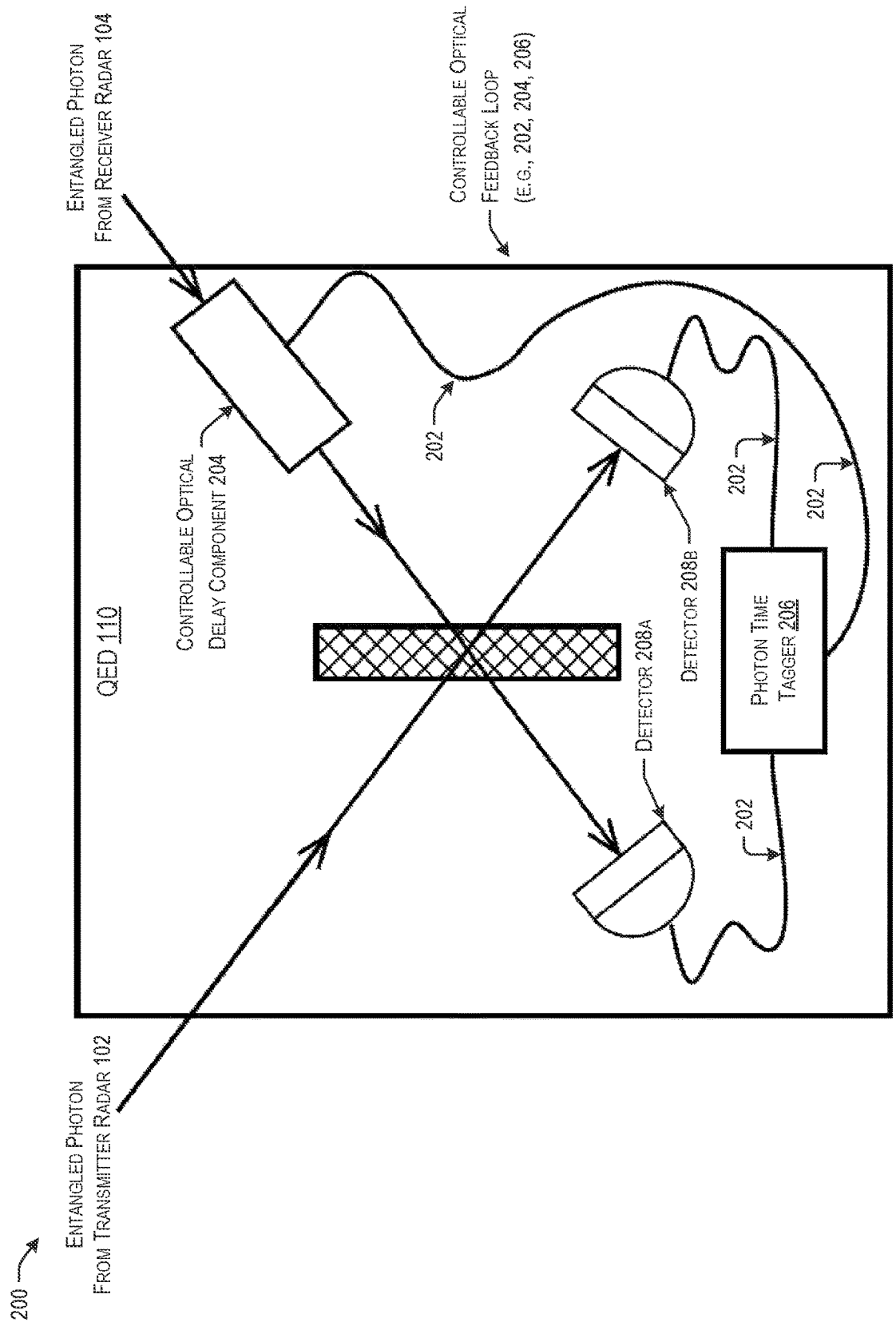
FIG. 2 illustrates a diagram of an example, non-limiting device of the example, non-limiting system of FIG. 1 that can facilitate quantum entanglement enhanced clock synchronization in a radar system in accordance with one or more example embodiments of the present disclosure.

FIG. 2 illustrates a diagram of an example, non-limiting device 200 of the example, non-limiting system of FIG. 1 that can facilitate quantum entanglement enhanced clock synchronization in a radar system in accordance with one or more example embodiments of the present disclosure. According to one or more embodiments of the present disclosure, device 200 can constitute and/or include quantum entanglement detector 110 described above and illustrated in FIG. 1.

As illustrated in the example embodiment depicted in FIG. 2, device 200 can include a feedback loop 202 coupled to a controllable optical delay component 204 and/or a photon time tagger 206, where photon time tagger 206 can be further coupled to a first detector 208a (denoted as "Detector A" in FIG. 2) and/or a second detector 208b (denoted as "Detector B" in FIG. 2). In this example embodiment and as described above with reference to FIG. 1, controllable optical delay component 204 can be operable to receive a first entangled photon that can be reflected from, for instance, receiver radar 104 and/or a second entangled photon that can be reflected from, for instance, transmitter radar 102. In this embodiment and as described above with reference to FIG. 1, controllable optical delay component 204 can be further operable to track quantum interference that can be associated with the first entangled photon and the second entangled photon to detect the above-described quantum interference effect (e.g., the HOM dip). In one or more embodiments of the present disclosure, feedback loop 202, controllable optical delay component 204, and/or photon time tagger 206 of quantum entanglement detector 110 can be employed by, for instance, system 100 described above to provide a controllable optical feedback loop that can preserve the above-described quantum interference effect upon detection (e.g., can preserve the HOM dip upon detection by quantum entanglement detector 110).

It should be appreciated that the radar time synchronization system according to one or more embodiments of the present disclosure can be implemented in a radar system such as, for instance, system 100 and/or a bi-static radar system to improve such a radar system using enhanced time synchronization afforded by the quantum optics HOM interference effect on entangled photons. For example, the radar time synchronization system according to one or more embodiments of the present disclosure can be provided as an add-on to any existing classical bi-static radar system to enhance its accuracy by utilizing quantum optics and/or volume holography in bi-static radars.

Figure 3:
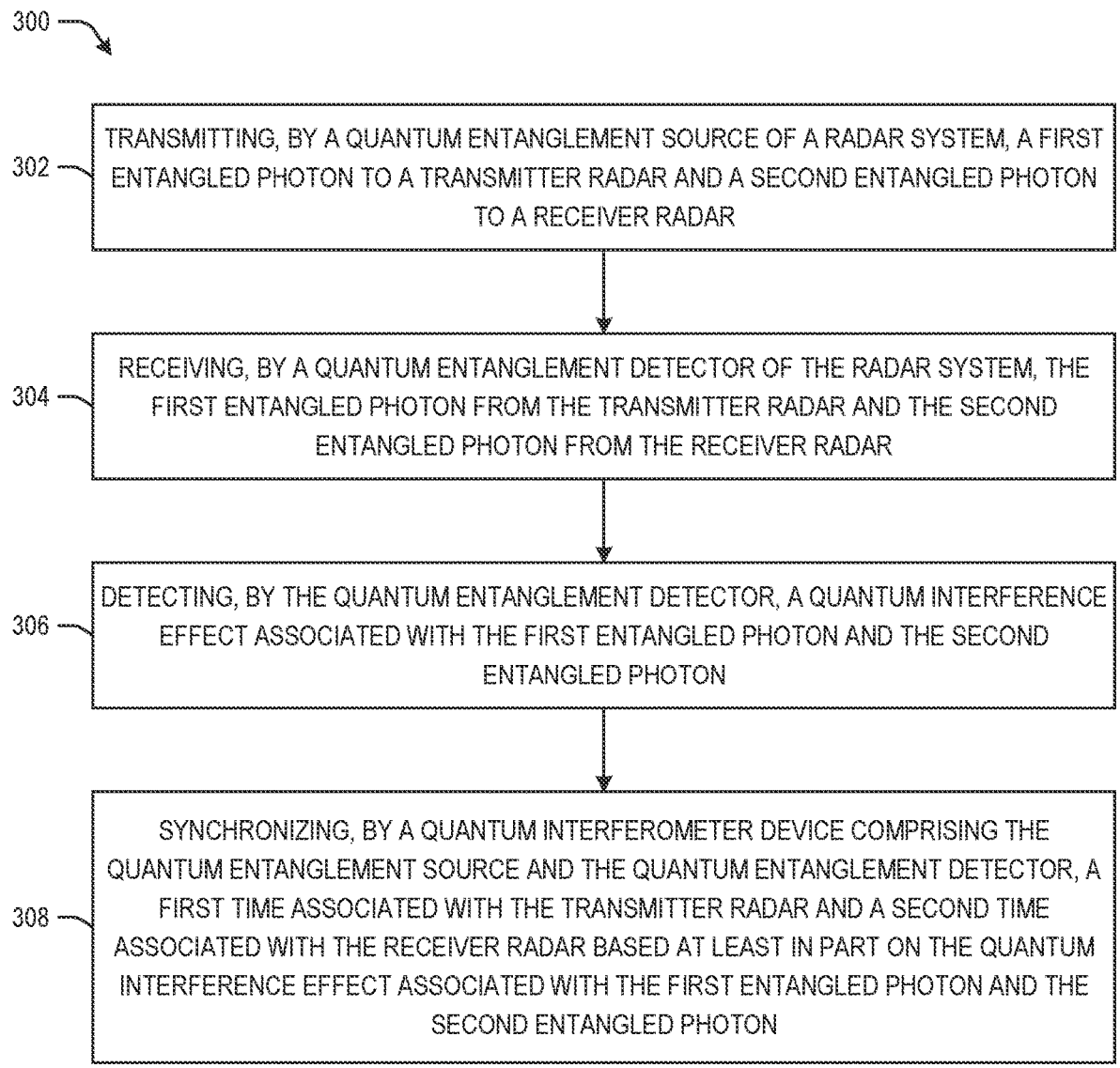
FIG. 3 illustrates a flow diagram of an example, non-limiting method that can be implemented to facilitate quantum entanglement enhanced clock synchronization in a radar system in accordance with one or more example embodiments of the present disclosure.

FIG. 3 illustrates a flow diagram of an example, non-limiting method that can be implemented to facilitate quantum entanglement enhanced clock synchronization in a radar system in accordance with one or more example embodiments of the present disclosure. According to one or more embodiments of the present disclosure, method 300 can be implemented using, for example, system 100, transmitter radar 102, receiver radar 104, quantum interferometer device 106, quantum entanglement source 108, quantum entanglement detector 110, and/or device 200 described above and illustrated in FIGS. 1 and 2. According to one or more embodiments of the present disclosure, method 300 can be implemented to facilitate quantum entanglement enhanced clock synchronization in a radar system such as, for instance, system 100.

In the example embodiment illustrated in FIG. 3, at 302, method 300 can include transmitting, by a quantum entanglement source (e.g., quantum entanglement source 108) of a radar system (e.g., system 100), a first entangled photon to a transmitter radar (e.g., transmitter radar 102) and a second entangled photon to a receiver radar (e.g., receiver radar 104).

In the example embodiment illustrated in FIG. 3, at 304, method 300 can include receiving, by a quantum entanglement detector (e.g., quantum entanglement detector 110) of the radar system, the first entangled photon from the transmitter radar and the second entangled photon from the receiver radar.

In the example embodiment illustrated in FIG. 3, at 306, method 300 can include detecting, by the quantum entanglement detector, a quantum interference effect (e.g., the above-described HOM dip) associated with the first entangled photon and the second entangled photon.

In the example embodiment illustrated in FIG. 3, at 308, method 300 can include synchronizing, by a quantum interferometer device (e.g., quantum interferometer device 106) comprising the quantum entanglement source and the quantum entanglement detector, a first time associated with the transmitter radar and a second time associated with the receiver radar based at least in part on the quantum interference effect associated with the first entangled photon and the second entangled photon.

Figure 4:
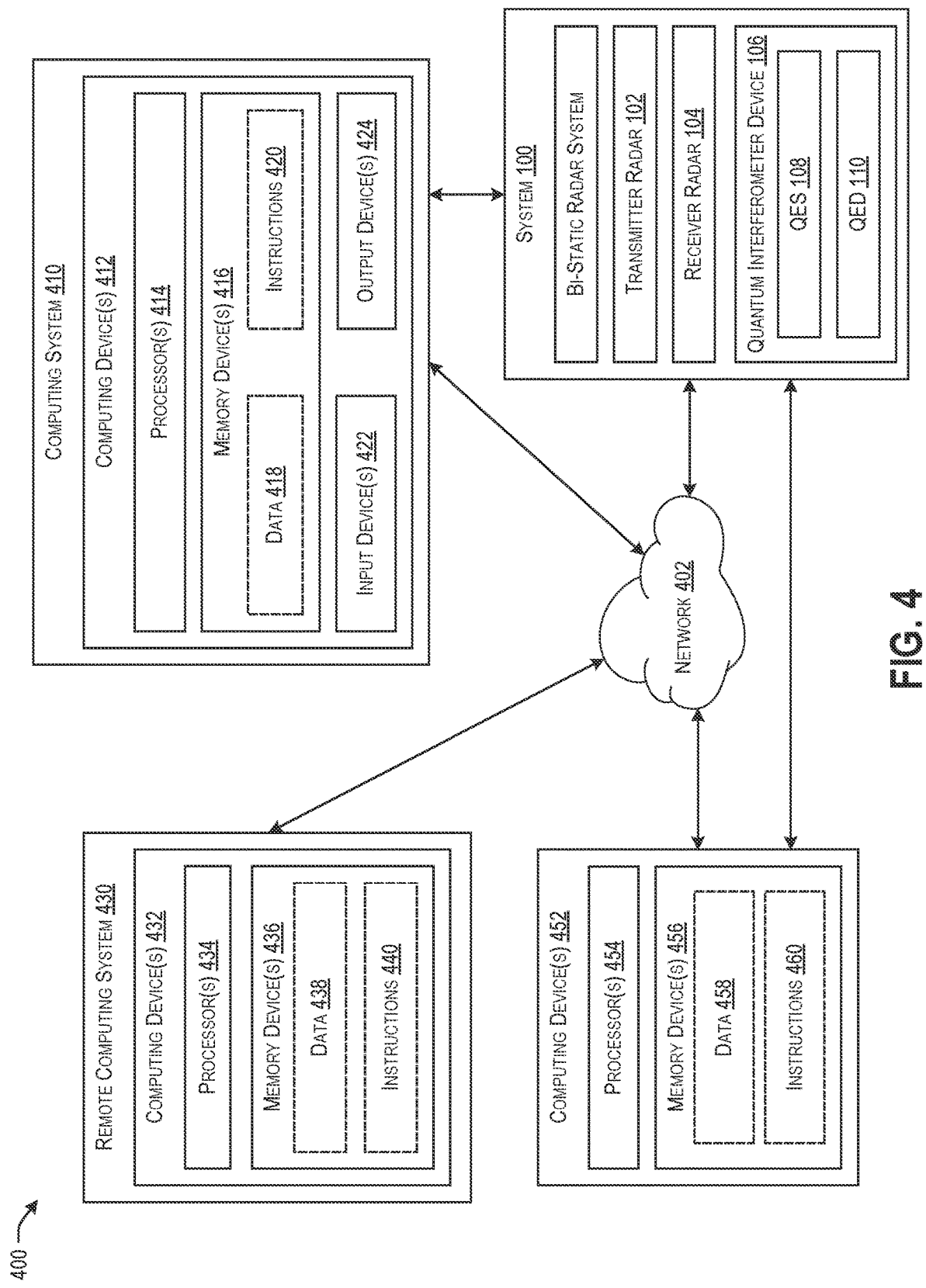
FIG. 4 depicts a block diagram of an example, non-limiting computing environment that can facilitate quantum entanglement enhanced clock synchronization in a radar system in accordance with one or more example embodiments of the present disclosure.

FIG. 4 depicts a block diagram of an example, non-limiting computing environment 400 that can facilitate quantum entanglement enhanced clock synchronization in a radar system in accordance with one or more example embodiments of the present disclosure. In the example embodiment depicted in FIG. 4, computing environment 400 can include a network 402, a computing system 410, one or more computing devices 412, one or more processors 414, one or more memory devices 416, data 418, instructions 420, a remote computing system 430, one or more computing devices 432, one or more processors 434, one or more memory devices 436, data 438, instructions 440, one or more computing devices 452, one or more processors 454, one or more memory devices 456, data 458, instructions 460, and/or system 100 described above and illustrated in FIG. 1.

Network 402 according to one or more embodiments of the present disclosure can include any type of communications network. For example, in some embodiments, network 402 can include a local area network (LAN), a wide area network (WAN), an intranet, an extranet, and/or the Internet. Further, in at least one embodiment, network 402 can include any number of wired or wireless connections and/or links that can be used to communicate with one or more systems (e.g., computing system 410, remote computing system 430, system 100) and/or one or more devices (e.g., one or more computing devices 452). Communication over network 402 according to one or more embodiments of the present disclosure can be performed via any type of wired and/or wireless connection and/or can use a wide variety of communication protocols (e.g., TCP/IP, HTTP, SMTP, FTP), encodings or formats (e.g., HTML, XML), and/or protection schemes (e.g., VPN, secure HTTP, SSL).

Computing system 410 according to one or more embodiments of the present disclosure can include any combination of systems and/or devices including one or more computing systems and/or one or more computing devices. Further, in some embodiments, computing system 410 can be connected (e.g., networked) to one or more computing systems and/or one or more computing devices via network 402. As illustrated in FIG. 4, computing system 410 can be directly (e.g., via a wired connection) and/or indirectly (e.g., via network 402) coupled (e.g., communicatively, operatively) to system 100 and/or one or more components thereof (e.g., the bi-static radar system of system 100, transmitter radar 102, receiver radar 104, quantum interferometer device 106, quantum entanglement source 108, quantum entanglement detector 110).

Computing system 410 can operate in various different configurations including as a server or a client machine in client-server network environment, or as a peer machine in a peer-to-peer (or distributed) network environment. Though computing system 410 is depicted in FIG. 4 as a single device, computing system 410 according to one or more embodiments of the present disclosure can include any collection or combination of devices that individually or in combination with other devices, execute a set of one or more instructions to perform any of the operations described herein.

In this example, computing system 410 can include one or more computing devices 412, which can include any type of computing device. For example, one or more computing devices 412 can include a personal computing device (e.g., a desktop computing device), a mobile computing device (e.g., a smartphone or tablet), a wearable computing device (e.g., a smartwatch), an embedded computing device, a web appliance, a server, a network router, a switch, a bridge, or any device capable of executing a set of instructions (e.g., any combination of instructions which can include sequential instructions and/or parallel instructions) associated with one or more operations and/or one or more actions to be performed by computing system 410 or any of the constituent components and/or devices of computing system 410.

As illustrated in the example embodiment depicted in FIG. 4, one or more computing devices 412 can include one or more processors 414. In at least one embodiment described herein, one or more processors 414 can be and/or include any processing device (e.g., a processor core, a microprocessor, an application-specific integrated circuit (ASIC), a field-programmable gate array (FPGA), a controller, or a microcontroller) and can include one processor or a plurality of processors that can be coupled to one another (e.g., operatively connected). In some embodiments, one or more processors 414 can include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

In at least one embodiment of the present disclosure, one or more computing devices 412 can include one or more memory devices 416. In these one or more embodiments, one or more memory devices 416 can be used to store data and/or information and can include one or more computer-readable media, one or more non-transitory computer-readable media, one or more non-transitory computer-readable storage media, and/or one or more machine-readable media. Though one or more memory devices 416 are depicted in FIG. 4 as a single unit (e.g., a single medium), the computer-readable storage media according to one or more embodiments of the present disclosure can include a single medium or multiple media (e.g., a centralized or distributed database, and/or associated caches and servers) that can store one or more sets of instructions. Further, in these one or more embodiments, the computer-readable storage media can include any medium that can: store, encode, and/or carry a set of instructions to be executed by a computing device; and/or cause the computing device to perform any of the one or more operations described herein. In some embodiments, the computer-readable storage media can include one or more solid-state memories, one or more optical media, and/or one or more magnetic media. In at least one embodiment described herein, one or more memory devices 416 can include, for instance, random access memory (RAM), read only memory (ROM), erasable programmable read only memory (EPROM), electrically erasable programmable read only memory (EEPROM), one or more flash memory devices, one or more magnetic storage devices (e.g., one or more hard disk drives), and/or another type of memory device.

In accordance with at least one embodiment described herein, one or more processors 414 can be configured to execute one or more instructions to perform the operations described herein including, for example, one or more operations associated with facilitating quantum entanglement enhanced clock synchronization in a radar system. For instance, in this or another embodiment, one or more processors 414 can be configured to execute one or more instructions to perform the operations described herein including, for example, one or more operations associated with facilitating quantum entanglement enhanced clock synchronization in a radar system. Further, one or more memory devices 416 can store data 418 and/or instructions 420, which can be executed by one or more processors 414 to cause one or more computing devices 412 to perform one or more operations.

Data 418 according to one or more embodiments of the present disclosure can include operation data. For example, in at least one embodiment, data 418 can constitute and/or include operation data that can be associated with and/or used to operate system 100 and/or one or more components thereof to facilitate quantum entanglement enhanced clock synchronization in a radar system as described above with reference to the example embodiment depicted in FIG. 1. In some embodiments, data 418 can constitute and/or include operation data such as, for instance, operation parameters that can be associated with and/or used to operate transmitter radar 102, receiver radar 104, quantum interferometer device 106, quantum entanglement source 108, and/or quantum entanglement detector 110 to facilitate quantum entanglement enhanced clock synchronization in a radar system as described above with reference to the example embodiment depicted in FIG. 1. In some embodiments, data 418 can constitute and/or include one or more of equations described herein such as, for instance, Equations (1), (2), (3), (4), (5), and/or (6) described above with reference to the example embodiment depicted in FIG. 1. In some embodiments, data 418 can constitute and/or include one or more input and/or output parameters and/or values of such equations described herein (e.g., Equations (1), (2), (3), (4), (5), and/or (6)).

Instructions 420 according to at least one embodiment of the present disclosure can include one or more instructions to use data including data 418 to perform one or more of the operations described herein. For example, in this and/or another embodiment, instructions 420 can include instructions to generate (e.g., derive) and/or implement (e.g., execute, compute) one or more of the equations described herein (e.g., Equations (1), (2), (3), (4), (5), and/or (6)) to facilitate quantum entanglement enhanced clock synchronization in a radar system. Additionally, or alternatively, in this and/or another embodiment, instructions 420 can constitute and/or include computer and/or machine-readable instructions (e.g., software, code, processing threads) that can be executed by one or more processors 414 to operate system 100 and/or one or more components thereof (e.g., the bi-static radar system of system 100, transmitter radar 102, receiver radar 104, quantum interferometer device 106, quantum entanglement source 108, quantum entanglement detector 110) to facilitate quantum entanglement enhanced clock synchronization in a radar system as described above with reference to FIG. 1.

In some embodiments, one or more memory devices 416 can be used to store one or more applications that can be operated by one or more processors 414. In at least one embodiment described herein, data 418, instructions 420, and/or the one or more applications can be associated with quantum entanglement enhanced clock synchronization in a radar system. Further, in some embodiments, computing system 410 can be configured to manage the one or more applications. For example, in these embodiments, computing system 410 can perform one or more operations associated with facilitating quantum entanglement enhanced clock synchronization in a radar system. For instance, in these or other embodiments, computing system 410 can perform one or more operations associated with operating system 100 and/or one or more components thereof in accordance with the example embodiments described above and illustrated in FIGS. 1, 2, and 3.

As illustrated in the example embodiment depicted in FIG. 4, one or more computing devices 412 can include one or more input devices 422 and/or one or more output devices 424. In accordance with at least one embodiment described herein, one or more input devices 422 can be configured to receive input (e.g., entity input) and can include one or more touch screens, one or more keyboards, one or more pointing devices, (e.g., mouse device), one or more buttons, one or more microphones, and/or one or more cameras. In one or more embodiments of the present disclosure, one or more output devices 424 can include one or more display devices, one or more loudspeaker devices, one or more haptic output devices, and/or another output device. By way of example, in some embodiments, one or more output devices 424 can be used to display a graphical user interface (GUI) via a display device that can include a touch screen layer that can be configured to detect one or more entity inputs.

Remote computing system 430 according to one or more embodiments of the present disclosure can include one or more computing devices 432. In at least one embodiment described herein, one or more computing devices 432 can respectively include one or more processors 434, one or more memory devices 436, data 438, and/or instructions 440. In at least one embodiment of the present disclosure, one or more processors 434, one or more memory devices 436, data 438, and/or instructions 440 can respectively include any of the attributes and/or capabilities of one or more processors 414, one or more memory devices 416, data 418, and/or instructions 420. For instance, in one embodiment, data 438 and/or instructions 440 can constitute and/or include the same data as data 418 and/or the same instructions as instructions 420, respectively. Further, in one or more embodiments described herein, one or more processors 434 and/or one or more memory devices 436 can each be configured to respectively perform any of the operations performed by one or more processors 414 and/or one or more memory devices 416.

In one or more embodiments of the present disclosure, remote computing system 430 can include any of the attributes and/or capabilities of computing system 410 and/or can be configured to perform any of the operations performed by computing system 410. Further, in at least one embodiment, remote computing system 430 can communicate with one or more devices and/or one or more systems via network 402. Remote computing system 430 according to one or more embodiments of the present disclosure can include one or more applications (e.g., computing software applications) that can be stored and/or executed by remote computing system 430. Further, in some embodiments, the one or more applications can include one or more applications that can be accessed from computing system 410 and/or can be at least partly operated from remote computing system 430.

In one or more embodiments of the present disclosure, one or more computing devices 452 can respectively include one or more processors 454, one or more memory devices 456, data 458, and/or instructions 460. In at least one embodiment of the present disclosure, one or more processors 454, one or more memory devices 456, data 458, and/or instructions 460 can respectively include any of the attributes and/or capabilities of one or more processors 414, one or more memory devices 416, data 418, and/or instructions 420. For instance, in one embodiment, data 458 and/or instructions 460 can constitute and/or include the same data as data 418 and/or the same instructions as instructions 420, respectively. Further, in one or more embodiments described herein, one or more processors 454 and/or one or more memory devices 456 can each be configured to respectively perform any of the operations performed by one or more processors 414 and/or one or more memory devices 416.

In at least one embodiment, one or more computing devices 452 can respectively communicate with one or more devices and/or one or more systems via network 402. For instance, as illustrated in FIG. 4, one or more computing devices 452 can be directly (e.g., via a wired connection)

and/or indirectly (e.g., via network 402) coupled (e.g., communicatively, operatively) to system 100 and/or one or more components thereof (e.g., the bi-static radar system of system 100, transmitter radar 102, receiver radar 104, quantum interferometer device 106, quantum entanglement source 108, quantum entanglement detector 110).

In some embodiments, any of one or more computing devices 452 can include one or more applications (e.g., computing software applications) that can be respectively stored and/or executed by one or more computing devices 452. Further, in some embodiments, the one or more applications can include one or more applications that can be accessed from computing system 410 and/or can be at least partly operated from any of one or more computing devices 452.

In at least one embodiment of the present disclosure, a computing device 452 can be coupled (e.g., communicatively, operatively) to system 100 and/or one or more components thereof (e.g., the bi-static radar system of system 100, transmitter radar 102, receiver radar 104, quantum interferometer device 106, quantum entanglement source 108, quantum entanglement detector 110) as illustrated in FIG. 4. In this and/or another embodiment, such a computing device 452 can operate system 100 and/or such one or more components thereof to facilitate quantum entanglement enhanced clock synchronization in a radar system according to the example embodiments described above and illustrated in FIGS. 1, 2, and 3. For instance, in this and/or another embodiment, such a computing device 452 can implement (e.g., via processor(s) 454) instructions 460 using data 458 to perform one or more of the operations and/or to implement one or more of the equations (e.g., Equations (1), (2), (3), (4), (5), and/or (6)) described above with reference to FIG. 1 to facilitate quantum entanglement enhanced clock synchronization in a radar system.

Figure 5:
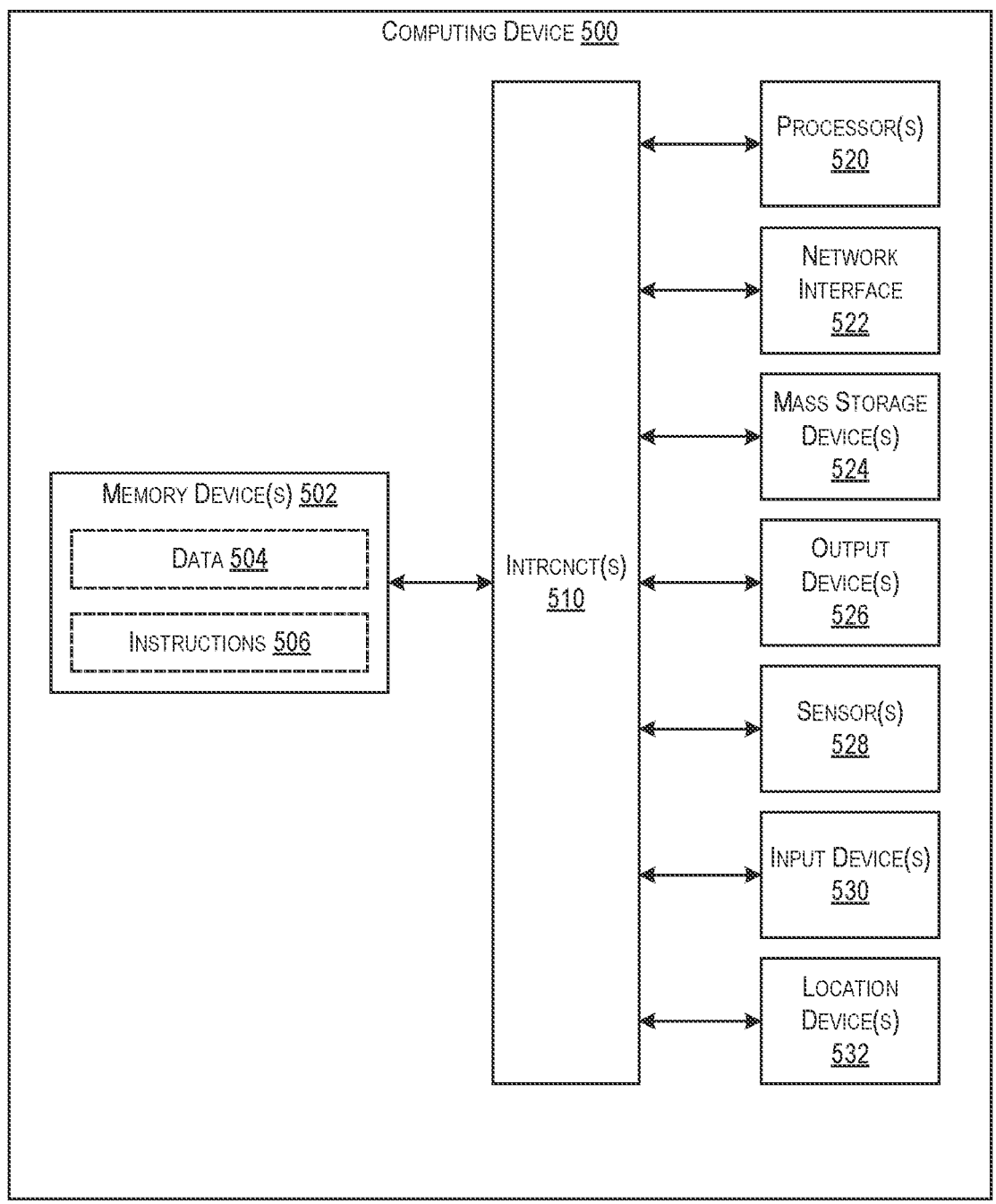
FIG. 5 depicts a block diagram of an example, non-limiting computing device that can facilitate quantum entanglement enhanced clock synchronization in a radar system in accordance with one or more example embodiments of the present disclosure.

FIG. 5 depicts a block diagram of an example, non-limiting computing device 500 that can facilitate quantum entanglement enhanced clock synchronization in a radar system in accordance with one or more example embodiments of the present disclosure. Computing device 500 according to one or more embodiments of the present disclosure can include one or more attributes and/or capabilities of computing system 410, remote computing system 430, and/or one or more computing devices 452 described above with reference to the example embodiment depicted in FIG. 4. Furthermore, computing device 500 can be configured to perform one or more operations and/or one or more actions that can be performed by computing system 410, remote computing system 430, and/or one or more computing devices 452.

As illustrated in the example embodiment depicted in FIG. 5, computing device 500 can include one or more memory devices 502, data 504, instructions 506, one or more interconnects 510 (denoted as "Intrcnct(s) 510" in FIG. 5), one or more processors 520, a network interface 522, one or more mass storage devices 524, one or more output devices 526, one or more sensors 528, one or more input devices 530, and/or one or more location devices 532.

In one or more embodiments of the present disclosure, one or more memory devices 502 can store information such as, for instance, data 504 and/or instructions 506. Further, in some embodiments, one or more memory devices 502 can include one or more non-transitory computer-readable media and/or one or more non-transitory computer-readable storage media, including RAM, ROM, EEPROM, EPROM, flash memory devices, magnetic disks, and/or combinations thereof. In at least one embodiment, the information, data (e.g., data 504), and/or instructions (e.g., instructions 506) stored by one or more memory devices 502 can be executed by one or more processors 520 to cause computing device 500 to perform operations including one or more operations associated with facilitating quantum entanglement enhanced clock synchronization in a radar system. For instance, in this or another embodiment, data 504 and/or instructions 506 stored by one or more memory devices 502 can be executed by one or more processors 520 to cause computing device 500 to perform operations including one or more operations associated with facilitating quantum entanglement enhanced clock synchronization in a radar system.

Data 504 according to one or more embodiments of the present disclosure can include one or more portions of data (e.g., data 418, data 438, and/or data 458) and/or instructions (e.g., instructions 420, instructions 440, and/or instructions 460) that can be stored in one or more memory devices 416, one or more memory devices 436, and/or one or more memory devices 456, respectively. For instance, in one embodiment, data 504 and/or instructions 506 can constitute and/or include the same data as data 418 and/or the same instructions as instructions 420, respectively. Furthermore, in some embodiments, data 504 can be received from one or more computing systems (e.g., remote computing system 430), where such one or more computing systems can be remote from computing device 500 (e.g., in another room, building, part of town, city, nation).

In one or more embodiments of the present disclosure, one or more interconnects 510 can include one or more interconnects or buses that can be used to send and/or receive one or more signals (e.g., electronic signals), data (e.g., data 504), and/or instructions (e.g., instructions 506) between components of computing device 500, including one or more memory devices 502, one or more processors 520, network interface 522, one or more mass storage devices 524, one or more output devices 526, one or more sensors 528 (e.g., a sensor array), one or more input devices 530, and/or one or more location devices 532. In some embodiments, one or more interconnects 510 can be arranged or configured in different ways. For example, in at least one embodiment, one or more interconnects 510 can be configured as parallel or serial connections. Further, in one or more embodiments, one or more interconnects 510 can include: one or more internal buses that can be used to connect internal components of computing device 500; and/or one or more external buses that can be used to connect internal components of computing device 500 to one or more external devices (e.g., one or more devices that can be external to computing device 500). By way of example, in at least one embodiment, one or more interconnects 510 can include different interfaces that can include, for instance, Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or another interface that can be used to connect components.

According to one or more embodiments of the present disclosure, one or more processors 520 can include one or more computer processors that can be configured to execute the one or more instructions that can be stored in one or more memory devices 502. For example, in these one or more embodiments, one or more processors 520 can include one or more general purpose central processing units (CPUs), application specific integrated circuits (ASICs), and/or one or more graphics processing units (GPUs). Further, in at least one embodiment, one or more processors 520 can perform one or more actions and/or operations including one or more actions and/or operations associated with, for instance, data 504 and/or instructions 506. In some embodiments, one or more processors 520 can include single or multiple core devices including a microprocessor, microcontroller, integrated circuit, and/or a logic device.

Network interface 522 according to one or more embodiments of the present disclosure can support network communications. In some embodiments, network interface 522 can support communication via networks that can include, for instance, a local area network and/or a wide area network (e.g., the Internet). For example, in at least one embodiment, network interface 522 can allow computing device 500 to communicate with, for instance, computing system 410, remote computing system 430, one or more computing devices 452, system 100, and/or one or more components of system 100 via network 402.

In one or more embodiments of the present disclosure, one or more mass storage devices 524 (e.g., a hard disk drive and/or a solid state drive) can be used to store information, data, and/or instructions that can include, for instance, data 504 and/or instructions 506. One or more output devices 526 according to one or more embodiments of the present disclosure can include one or more display devices (e.g., LCD display, OLED display, Mini-LED display, microLED display, plasma display, and/or CRT display), one or more light sources (e.g., LEDs), one or more loudspeakers, and/or one or more haptic output devices (e.g., one or more devices that are configured to generate vibratory output).

According to at least one embodiment described herein, one or more sensors 528 can be configured to detect various states and/or can include one or more cameras, one or more light detection and ranging (LiDAR) devices, one or more sonar devices, and/or one or more radar devices. Further, in some embodiments, one or more sensors 528 can be used to provide input (e.g., an image of an entity captured using the one or more cameras) that can be used as part of an entity interface (e.g., a GUI) that can be used to, for instance, facilitate quantum entanglement enhanced clock synchronization in a radar system in accordance with one or more embodiments of the present disclosure.

In accordance with at least one embodiment described herein, one or more input devices 530 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that can be used to detect gestures that can trigger one or more operations by computing device 500).

Although one or more memory devices 502 and one or more mass storage devices 524 are depicted separately in FIG. 5, in some embodiments, one or more memory devices 502 and one or more mass storage devices 524 can be regions within the same memory module. Computing device 500 according to one or more embodiments of the present disclosure can include one or more additional processors, memory devices, and/or network interfaces that can be provided separately or on the same chip or board. In some embodiments, one or more memory devices 502 and one or more mass storage devices 524 can include one or more computer-readable media that can include, for instance, non-transitory computer-readable media, RAM, ROM, hard drives, flash drives, and/or another memory device.

One or more memory devices 502 according to one or more embodiments of the present disclosure can store sets of instructions for applications that can include an operating system that can be associated with various software applications and/or data. For example, in at least one embodiment, one or more memory devices 502 can store sets of instructions for one or more applications that can be subject to one or more security policies that can be generated and/or implemented by computing device 500 and/or one or more other computing devices or one or more computing systems. In some embodiments, one or more memory devices 502 can be used to operate and/or execute a general-purpose operating system that can operate on one or more mobile computing devices and/or stationary devices that can include, for example, smartphones, laptop computing devices, tablet computing devices, and/or desktop computers.

The software applications that can be operated and/or executed by computing device 500 in accordance with at least one embodiment described herein can include, for instance, applications associated with system 100 and/or one or more components thereof, computing system 410, remote computing system 430, and/or one or more computing devices 452 described above with reference to the example embodiments depicted FIGS. 1, 2, 3, and 4. Further, in some embodiments, such software applications that can be operated and/or executed by computing device 500 can include, for instance, native applications, web services, and/or web-based applications.

According to one or more embodiments of the present disclosure, one or more location devices 532 can include one or more devices and/or circuitry that can determine the position of computing device 500. For example, in at least one embodiment, one or more location devices 532 can determine an actual and/or relative position of computing device 500 by using a satellite navigation positioning system (e.g. a global positioning system (GPS), a Galileo positioning system, the GLObal Navigation satellite system (GLONASS), the BeiDou Satellite Navigation and Positioning system), an inertial navigation system, a dead reckoning system, based on an internet protocol (IP) address, by using triangulation and/or proximity to cellular towers or Wi-Fi hotspots, and/or beacons.

In at least one embodiment of the present disclosure, computing device 500 can be coupled (e.g., communicatively and/or operatively via a wired or wireless connection (e.g., network 402)) to system 100 and/or one or more components thereof (e.g., the bi-static radar system of system 100, transmitter radar 102, receiver radar 104, quantum interferometer device 106, quantum entanglement source 108, quantum entanglement detector 110). In this and/or another embodiment, computing device 500 can operate system 100 and/or such one or more components thereof to facilitate quantum entanglement enhanced clock synchronization in a radar system according to the example embodiments described above and illustrated in FIGS. 1, 2, and 3. For instance, in this and/or another embodiment, computing device 500 can implement (e.g., via processor(s) 520) instructions 460 using data 458 to perform one or more of the operations and/or to implement one or more of the equations (e.g., Equations (1), (2), (3), (4), (5), and/or (6)) described above with reference to FIG. 1 to facilitate quantum entanglement enhanced clock synchronization in a radar system.

Aspects of the present disclosure are discussed with reference to clock synchronization in radar applications for purposes of illustration and discussion. However, those of ordinary skill in the art, using the disclosures provided herein, will understand that aspects of the present technology can be used with other clock synchronization applications without deviating from the scope of the present disclosure, such as clock synchronization between transmitter and receiver in communications technology (e.g., wireless communication, cellular communication), etc.

The method(s) described herein and/or illustrated in the accompanying figures (e.g., method 300) in accordance with one or more example embodiments of the present disclosure depict steps performed in a particular order for purposes of illustration and discussion. Those of ordinary skill in the art, using the disclosures provided herein, will understand that various steps of any of such methods can be adapted, omitted, rearranged, include steps not illustrated, performed simultaneously, and/or modified in various ways without deviating from the scope of the present disclosure.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A radar time synchronization system, comprising:
    a transmitter radar;
    a receiver radar; and
    a quantum interferometer device communicatively coupled to the transmitter radar and the receiver radar, the quantum interferometer device comprising:
        a quantum entanglement source operable to transmit a first entangled photon to the transmitter radar and a second entangled photon to the receiver radar; and
        a quantum entanglement detector operable to receive the first entangled photon from the transmitter radar and the second entangled photon from the receiver radar and further operable to detect a quantum interference effect associated with the first entangled photon and the second entangled photon,
    wherein the quantum interferometer device synchronizes a first time associated with the transmitter radar and a second time associated with the receiver radar based at least in part on the quantum interference effect associated with the first entangled photon and the second entangled photon.

2. The radar time synchronization system of claim 1, wherein the quantum interferometer device comprises a Hong-Ou-Mandel interferometer device, and wherein the quantum interference effect is a Hong-Ou-Mandel interference effect.

3. The radar time synchronization system of claim 1, wherein the quantum entanglement detector comprises a controllable optical delay component that is operable to:
    receive at least one of the first entangled photon or the second entangled photon; and
    track quantum interference associated with the first entangled photon and the second entangled photon to detect the quantum interference effect.

4. The radar time synchronization system of claim 3, wherein the quantum entanglement detector further comprises a photon time tagger coupled to the controllable optical delay component, a first detector of the quantum entanglement detector, and a second detector of the quantum entanglement detector to provide a controllable optical feedback loop that preserves the quantum interference effect upon detection.

5. The radar time synchronization system of claim 1, wherein the radar time synchronization system is operationally independent of at least one of a global positioning system or any external timing system.

6. The radar time synchronization system of claim 1, further comprising a bi-static radar system or a multi-static radar system coupled to the quantum interferometer device, wherein the bi-static radar system or the multi-static radar system operates based at least in part on synchronization of the first time and the second time, the synchronization being based at least in part on the quantum interference effect.

7. The radar time synchronization system of claim 1, further comprising a first optical link coupled to the transmitter radar and the quantum entanglement source and a second optical link coupled to the receiver radar and the quantum entanglement source, wherein at least one of the first optical link or the second optical link comprises at least one of a free-space optical link or a fiber optic link.

8. The radar time synchronization system of claim 1, further comprising one or more cube corner reflectors associated with at least one of the transmitter radar or the receiver radar, the one or more cube corner reflectors operable to reflect at least one of the first entangled photon or the second entangled photon, respectively, to the quantum entanglement detector.

9. The radar time synchronization system of claim 1, wherein the quantum interferometer device synchronizes the first time and the second time to less than a picosecond based at least in part on at least one of detection or preservation of the quantum interference effect.

10. A method to synchronize time of a radar system, the method comprising:
    transmitting, by a quantum entanglement source of the radar system, a first entangled photon to a transmitter radar and a second entangled photon to a receiver radar;
    receiving, by a quantum entanglement detector of the radar system, the first entangled photon from the transmitter radar and the second entangled photon from the receiver radar;
    detecting, by the quantum entanglement detector, a quantum interference effect associated with the first entangled photon and the second entangled photon; and
    synchronizing, by a quantum interferometer device comprising the quantum entanglement source and the quantum entanglement detector, a first time associated with the transmitter radar and a second time associated with the receiver radar based at least in part on the quantum interference effect associated with the first entangled photon and the second entangled photon.

11. The method of claim 10, wherein the quantum interferometer device comprises a Hong-Ou-Mandel interferometer device, and wherein the quantum interference effect is a Hong-Ou-Mandel interference effect.

12. The method of claim 10, further comprising:
    receiving, by a controllable optical delay component of the quantum entanglement detector, at least one of the first entangled photon or the second entangled photon; and
    tracking, by the controllable optical delay component, quantum interference associated with the first entangled photon and the second entangled photon to detect the quantum interference effect.

13. The method of claim 12, further comprising:
    preserving, by the quantum entanglement detector, the quantum interference effect upon detection; and
    synchronizing, by the quantum interferometer device, the first time and the second time to less than a picosecond based at least in part on detection and preservation of the quantum interference effect.

14. The method of claim 10, wherein the radar system is a bi-static radar system or a multi-static radar system.

15. A quantum interferometer device, comprising:
a quantum entanglement source operable to transmit a first entangled photon to a transmitter radar of a radar system and a second entangled photon to a receiver radar of the radar system; and
a quantum entanglement detector operable to receive the first entangled photon from the transmitter radar and the second entangled photon from the receiver radar and further operable to detect a quantum interference effect associated with the first entangled photon and the second entangled photon,
wherein the quantum interferometer device synchronizes a first time associated with the transmitter radar and a second time associated with the receiver radar based at least in part on the quantum interference effect associated with the first entangled photon and the second entangled photon.

16. The quantum interferometer device of claim 15, wherein the quantum interferometer device comprises a Hong-Ou-Mandel interferometer device, and wherein the quantum interference effect is a Hong-Ou-Mandel interference effect.

17. The quantum interferometer device of claim 15, wherein the quantum entanglement detector comprises a controllable optical delay component that is operable to:
receive at least one of the first entangled photon or the second entangled photon; and
track quantum interference associated with the first entangled photon and the second entangled photon to detect the quantum interference effect.

18. The quantum interferometer device of claim 17, wherein the quantum entanglement detector further comprises a photon time tagger coupled to the controllable optical delay component, a first detector of the quantum entanglement detector, and a second detector of the quantum entanglement detector to provide a controllable optical feedback loop that preserves the quantum interference effect upon detection.

19. The quantum interferometer device of claim 15, wherein the quantum interferometer device synchronizes the first time and the second time to less than a picosecond based at least in part on at least one of detection or preservation of the quantum interference effect.

20. The quantum interferometer device of claim 15, wherein the radar system is a bi-static radar system or a multi-static radar system.

* * * * *